United States Patent [19]

Blanpain et al.

[11] Patent Number: 4,997,868

[45] Date of Patent: Mar. 5, 1991

[54] CATIONIC ASPHALT EMULSIONS

[75] Inventors: Peter R. J. Blanpain, Mannheim; Roland F. E. Offner, Neustadt, both of Fed. Rep. of Germany; Guy F. Mori, Schiltigheim, France; John W. Creak, Marly, Switzerland

[73] Assignee: BASF Aktiengesellschaft, Ludwigshafen, Fed. Rep. of Germany

[21] Appl. No.: 182,470

[22] Filed: Apr. 18, 1988

Related U.S. Application Data

[63] Continuation-in-part of Ser. No. 42,341, Apr. 24, 1987, abandoned.

[30] Foreign Application Priority Data

May 13, 1986 [FR] France ................................ 86 06841

[51] Int. Cl.[5] .......................................... C08L 95/00
[52] U.S. Cl. ........................................ 524/59; 524/60; 524/61
[58] Field of Search ............................ 524/59, 60, 61

[56] References Cited

U.S. PATENT DOCUMENTS 3,493,408  2/1970  Drukker ................................ 524/60
4,492,781  1/1985  Duszak et al. .
4,523,957  6/1985  Graf et al. ............................ 524/60

OTHER PUBLICATIONS

Chemical Abstracts, vol. 96, 1982, No. 96:163961k, "Setting a Latex of a Film-Forming Polymer", Wilson.
Chemical Abstracts, vol. 83, 1975, No. 196173q, "Powders and Coatings of Asphalt or Asphalt-Latex Sealed Against Water and Gas", Macha et al.
Chemical Abstracts, vol. 81, 1974, No. 171549n, "Bitumen Emulsion Coating Compositions", Rambelli.

Primary Examiner—Joseph L. Schofer
Assistant Examiner—Peter D. Mulcahy
Attorney, Agent, or Firm—Bruce E. Harang

[57] ABSTRACT

The setting time of cationic emulsions of asphalt, bitumen, coal tar or a mixture thereof may be shortened by incorporating into such emulsion at least 0.001 parts by weight per 100 parts by dry weight of said emulsion of a polycarboxylic acid.

7 Claims, No Drawings

CATIONIC ASPHALT EMULSIONS

PRIOR APPLICATION

This application is a continuation-in-part of application Ser. No. 07/042,341 filed Apr. 24, 1987 now abandoned.

FIELD OF THE INVENTION

The present invention relates to the modification of cationic emulsions of asphalt, bitumen, coal tar or a mixture thereof. As used in this specification, asphalt is intended to include naturally occurring asphalts such as Trinidad Lake asphalts and synthetic asphalts produced from the refining of crude oil.

BACKGROUND OF THE INVENTION

Emulsions of asphalt, bitumen, and coal tar have a wide number of applications, including but not limited to the production of aggregate pavement. One of the problems encountered with asphalt emulsions is the length of time it takes for the emulsion to start to set and the time for the emulsion to dry. This is extremely expensive when traffic must be kept off a lane of a highway for a lengthy period of time. The properties of asphalt, bitumen, coal tar or a mixture thereof may be improved by the incorporation of a polymer. This improves adhesion, ductility, tensile strength, and cold temperature properties of the asphalt, bitumen or coal tar. This may be done by melting the asphalt and adding the polymer. This process is energy intensive. The addition of polymer to asphalt, bitumen, coal tar or a mixture thereof may be accomplished by mixing emulsions of such material with a latex of the polymer. While this process is less energy intensive, it further accentuates the delay in setting times and drying times of asphalt emulsions.

One approach to enhance the drying time of asphalt emulsions has been to include a silicofluoride gelling agent into the system. Examples of this approach include CA 96: 163961k of E.P. 45,619 published Feb. 10, 1982 in the name of the British Petroleum Co. Ltd.; CA 83: 196173g of Belgium Patent 821,210 published Feb. 17, 1975 in the name of Kamenouhelve Poly Oborove Rzeditelstvi; and CA 81:171549n of German Offen. 2,363,085 published July 4, 1974 in the name of Rambelli Giacinto. Silicofluorides are time dependent gelling agents. Thus, the silicofluoride is mixed with the emulsion shortly before the emulsion is to set. This necessitates a two component application system or use of the system immediately after adding the gelling agent. The silicofluorides are used as gelling agents with anionic emulsions.

One approach is to add one or more thickening agents to asphalt emulsions. This approach is taught by Duzak et al. (Hercules Inc.) U.S. Pat. No. 4,492,781 which discloses a composition of an emulsion of asphalt/rubber/acrylic copolymer (100–10:0–90:0–70), a water soluble polymer, reinforcing component, aggregate, a curing and thickening agent and a rosin ester. The acrylic polymer disclosed in the Hercules patent is a copolymer of ethylene and acrylic acid. The water soluble polymer described as RETEN is an acrylamide copolymer. Neither of these polymer types is the poly $C_{3-4}$ ethylenically unsaturated carboxylic acid required in the present invention. Additionally, such polymer types do not improve the setting or drying time of emulsions of asphalt, bitumen or coal tar which have been modified with an aqueous emulsion of a polymer.

None of the prior art teaches that a cationic emulsion of asphalt, bitumen, coal tar, or a mixture thereof which has been modified with an aqueous emulsion of a polymer may in admixture with aggregate be set and dried at a faster rate by including relatively minor amounts of low molecular weight polymers of acrylic or methacrylic acid.

U.S. Pat. No. 3,493,408 issued Feb. 3, 1970 discloses clay dispersed bitumen emulsions stabilized with salts of oxalic acid. The present invention is not intended to be used with such emulsions as they are anionic.

As used in this specification the term set means the point at which aggregate in contact with an aqueous emulsion of bitumen, asphalt, tar or a mixture thereof is first resistant to movement. Setting time means the time it takes from initial contact with aggregate for an emulsion of asphalt, bitumen, tar or a mixture thereof to set.

SUMMARY OF THE INVENTION

The present invention provides a method for causing an aqueous cationic emulsion of bitumen, asphalt, coal tar, or a mixture thereof, which is not clay dispersed, to become resistant to movement in less than 40 minutes after contact, at room temperature, with aggregate which comprises adding to said cationic emulsion per 100 parts by weight of bitumen, asphalt, coal tar or a mixture thereof an aqueous cationic compound having a pH from 1 to 5 which is not stabilized with a salt of oxalic acid, comprising:

(i) from 0.001 to 0.2 parts by weight of one or more polymers selected from the group consisting of acrylic acid, methacrylic acid and mixtures thereof, which polymers have a molecular weight less than 60,000;

(ii) from 0.1 to 2.0 parts by weight of a cationic surfactant of the formula

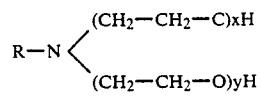

wherein R is a $C_{10-18}$ alkenyl radical; x and y are integers and the sum of $x+y$ is from 2 to 20; and (iii) up to 20 parts by dry weight of a latex of a polymer selected from the group consisting of:

(i) copolymers comprising: from about 20 to 60 weight percent of a $C_{8-12}$ vinyl aromatic monomer which may be unsubstituted or substituted by a $C_{1-4}$ alkyl radical or a chlorine or bromine atom; and from about 80 to 40 weight percent of a $C_{4-6}$ conjugated diolefin;

(ii) terpolymers comprising from about 20 to 60 weight percent of a $C_{8-12}$ vinyl aromatic monomer which may be unsubstituted or substituted by a $C_{1-4}$ alkyl radical or a chlorine or bromine atom; from about 80 to 40 weight percent of a $C_{4-6}$ conjugated diolefin; and from about 0.5 to 10 weight percent of one or more monomers selected from the group consisting of $C_{3-6}$ ethylenically unsaturated carboxylic acids; $C_{1-4}$ alkyl or hydroxy alkyl esters of $C_{3-6}$ ethylenically unsaturated carboxylic acid; $C_{3-6}$ ethylenically unsaturated aldehydes, amides of $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxy alkyl radicals;

(iii) polymers of one or more $C_{4-6}$ conjugated diolefins which may be unsubstituted or substituted by a chlorine atom;
(iv) copolymers of up to about 40 weight percent of a $C_{3-6}$ alkenyl nitrile; and the balance one or more $C_{4-6}$ conjugated diolefins;
(v) copolymers of from 1 to about 40 weight percent of a $C_{2-3}$ alpha olefin; from about 99 to 50 weight percent of a $C_{2-8}$ alkenyl or hydroxy alkenyl ester of a $C_{1-12}$ saturated carboxylic acid; and optionally from about 0.5 to 10 weight percent of one or more monomers selected from the group consisting of: $C_{3-6}$ ethylenically unsaturated carboxylic acids; $C_{3-6}$ ethylenically unsaturated aldehydes; $C_{1-4}$ alkyl and hydroxy alkyl esters of $C_{3-6}$ ethylenically unsaturated carboxylic acids; and amides of $C_{3-6}$ ethylenically unsaturated carboxylic acids which amides may be unsubstituted or substituted at the nitrogen atom by one or more radicals selected from the group consisting of $C_{1-4}$ alkyl or hydroxy alkyl radicals.

Preferably the polymer is used in an amount sufficient to provide at least about 0.001 parts by dry weight of said polymer of acrylic acid, methacrylic acid, or a mixture thereof or salts thereof per 100 parts by dry weight of said cationic asphalt emlusion.

The present invention also provides a composition which does not contain clay or salts of oxalic acid, comprising per 100 parts by dry weight of a cationic emulsion of bitumen, asphalt, coal tar and a mixture thereof from 0.001 to 0.2 parts by weight of a polymer selected from the group consisting of acrylic acid, methacrylic acid, and mixtures thereof, from 0.1 to 2 parts by weight of a cationic surfactant of the formula

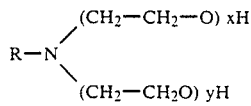

wherein x and y are integers and the sum of $x+y$ is from 2 to 20, and up to 20 parts by dry weight of a latex of a polymer selected from the group consisting of:
(i) copolymers comprising: from about 20 to 60 weight percent of a $C_{8-12}$ vinyl aromatic monomer which may be unsubstituted or substituted by a $C_{1-4}$ alkyl radical or a chlorine or bromine atom; and from about 80 to 40 weight percent of a $C_{4-6}$ conjugated diolefin;
(ii) terpolymers comprising from about 20 to 60 weight percent of a $C_{8-12}$ vinyl aromatic monomer which may be unsubstituted or substituted by a $C_{1-4}$ alkyl radical or a chlorine or bromine atom; from about 80 to 40 weight percent of a $C_{4-6}$ conjugated diolefin; and from about 0.5 to 10 weight percent of one or more monomers selected from the group consisting of $C_{3-6}$ ethylenically unsaturated carboxylic acids; $C_{1-4}$ alkyl or hydroxy alkyl esters of $C_{3-6}$ ethylenically unsaturated carboxylic acid; $C_{3-6}$ ethylenically unsaturated aldehydes, amides of $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxy alkyl radicals;
(iii) polymers of one or more $C_{4-6}$ conjugated diolefins which may be unsubstituted or substituted by a chlorine atom;
(iv) copolymers of up to about 40 weight percent of a $C_{3-6}$ alkenyl nitrile; and the balance one or more $C_{4-6}$ conjugated diolefins;
(v) copolymers of from 1 to about 40 weight percent of a $C_{2-3}$ alpha olefin; from about 99 to 50 weight percent of a $C_{2-8}$ alkenyl or hydroxy alkenyl ester of a $C_{1-12}$ saturated carboxylic acid; and optionally from about 0.5 to 10 weight percent of one or more monomers selected from the group consisting of: $C_{3-6}$ ethylenically unsaturated carboxylic acids; $C_{3-6}$ ethylenically unsaturated aldehydes; $C_{1-4}$ alkyl and hydroxy alkyl esters of $C_{3-6}$ ethylenically unsaturated carboxylic acids; and amides of $C_{3-6}$ ethylenically unsaturated carboxylic acids which amides may be unsubstituted or substituted at the nitrogen atom by one or more radicals selected from the group consisting of $C_{1-4}$ alkyl or hydroxy alkyl radicals.

DETAILED DESCRIPTION OF THE INVENTION

The cationic emulsions of ashalt, bitumen, coal tar or a mixture thereof may be purchased commercially or prepared in a high shear colloid mill. The preparation of such emulsions per se is not intended to form part of the present invention.

The setting time should be less than about 40, preferably less than 30 minutes. If the cationic emulsion of asphalt, bitumen, coal tar or a mixture thereof is not modified with a latex the setting time may be as low as 5 minutes. If the emulsion is modified with a latex of a polymer the setting time may range from about 15 to 40 minutes.

In accordance with the present invention, such cationic emulsions of asphalt, bitumen, coal tar and a mixture thereof are modified with at least about 0.001, preferably up to about 1, most preferably 0.001 to 0.2 parts by dry weight of a polymer selected from the group consisting of acrylic acid, methacrylic acid, a mixture thereof or salts thereof.

Solutions of such polymers are anionic. Cationic solutions of such polymers may be made using conventional techniques known by the industry. A cationic emulsifier is added to the anionic solution of the polycarboxylic acid salt and then the pH is adjusted to from about 1 to about 5, preferably from about 2 to about 4, most preferably from about 3 to 3.5. The pH of the solution is adjusted with an acid. Useful inorganic acids include hydrochloric acid, sulfuric acid and phosphoric acid. Useful organic acids include lower alkyl ($C_{1-4}$) acids other than oxalic acid such as acetic acid and formic acid. The surfactant will contain a nitrogen, sulphur or phosphorous atom. The surfactants may be "onium" compounds. Surfactants containing a nitrogen atom may be a primary, secondary or tertiary amine. A particularly useful class of surfactants are tertiary amines of the formula

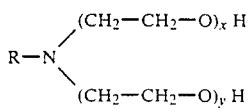

wherein R is a $C_{10-18}$ alkenyl radical and x and y are integers and the sum of $x+y$ is from 2 to 20.

Other surfactants include amphoteric surfactants which contain both a carboxyl group and a nitrogen atom including ampholytes and betaines. The surfactant may be an amine oxide. Generally, the surfactant is used in an amount up to about 10 percent by weight of the total polymer added to the cationic emulsion. Preferably, the surfactant is used in an amount from about 5 to 10 percent by weight based on the total polymer added to the cationic emulsion of asphalt, bitumen, coal tar or a mixture thereof.

Preferably the polymer of acrylic, or methacrylic acid, or a mixture thereof or salts thereof is mixed with a latex of a polymer selected from the following group.

Polymers comprising from about 20 to 60, preferably 20 to 40 weight percent of a $C_{8-12}$ vinyl aromatic monomer which may be unsubstituted or substituted by a $C_{1-4}$ alkyl radical or a chlorine or bromine atom; and from about 80 to 40, preferably 80 to 60, weight percent of a $C_{4-6}$ conjugated diolefin. SBR polymers are typical of this class. Preferably the SBR is a latex prepared by a cold emulsion polymerization process. Suitable vinyl aromatic monomers in addition to styrene include alpha methyl styrene, t-butyl styrene, chlorostyrene and bromostyrene. Suitable conjugated diolefins in addition to 1,3 butadiene include isoprene.

The above polymers may contain functional monomer(s) such as a copolymerizable carboxylic acids, aldehydes, esters, amides or a mixture thereof. The functional monomer(s) may be present in an amount from about 0.5 up to about 10 weight percent. Suitable carboxylic acid monomers are $C_{3-6}$ ethylenically unsaturated carboxylic acids, including acrylic acid, methacrylic acid, fumaric acid and itaconic acid. The functional monomer may be a $C_{3-6}$ ethylenically unsaturated aldehyde such as acrolein. The functional monomer may be a $C_{1-4}$ alkyl or hydroxy alkyl ester of a $C_{3-6}$ ethylenically unsaturated carboxylic acid. Suitable ester monomers include methyl acrylate, methyl methacrylate, ethyl acrylate, ethyl methacrylate, butyl acrylate, butyl methacrylate, hydroxy ethyl acrylate and half esters of dicarboxylic acids such as the ethyl half ester of itaconic acid and hydroxy ethyl half ester of maleic acid. The functional monomer may be an amide of a $C_{3-6}$ carboxylic acid such as acrylamide, methacrylamide. The amides may be unsubstituted or substituted at the nitrogen atom by a $C_{1-4}$ alkyl radical or hydroxy alkyl radical. Suitable substituted amides include N-methyl acrylamide, N-ethyl acrylamide, N-methylol acrylamide, N-methyl methacrylamide, N-ethyl methacrylamide, N-methylol methacrylamide.

The polymer may comprise one or more monomers of $C_{4-6}$ conjugated diolefins which may be unsubstituted or substituted by a chlorine atom. Preferred members of this group are latices of natural rubber or chloroprene.

The polymer may be a nitrile polymer. Typically, these polymers comprise up to 40 weight percent of a $C_{3-6}$ alkenyl nitrile and the balance a $C_{4-6}$ conjugated diolefin. Preferred nitrile are acrylonitrile and preferred diolefins are butadiene and isoprene. These polymers are particularly useful where the final composite may be subjected to oils, or solvents. This type of emulsion of asphalt, bitumen or coal tar is particularly useful in the construction of refueling aprons at airports.

The polymer may be copolymer of from 90 to 75 weight percent of a $C_{2-3}$ olefin and from 10 to 25 weight percent of a $C_{3-4}$ ethylenically unsaturated carboxylic acid. Preferred monomers are ethylene and acrylic or methacrylic acid.

The polymer may be a polymer of a $C_{2-3}$ alpha olefin and an unsaturated ester of a saturated organic acid.

Such polymers may optionally contain up to 10, preferably from about 0.5 to 10, weight percent of a functional monomer. Such monomers have been discussed above.

Typically such polymers comprise:
from about 1 to 40, preferably about 5 to 25, weight percent of a $C_{2-3}$ alpha olefin monomer,
from about 99 to 50, preferably 95 to 65, weight percent of a $C_{2-8}$ alkenyl or hydroxy alkenyl ester of a $C_{1-12}$ saturated carboxylic acid; and
optionally from about 0.5 to 10, preferably from about 0.5 to 5, weight percent of one or more monomers selected from the group consisting of:
$C_{3-6}$ ethylenically unsaturated carboxylic acids;
$C_{3-6}$ ethylenically unsaturated aldehydes;
$C_{1-4}$ alkyl and hydroxy alkyl esters of a $C_{3-6}$ ethylenically unsaturated carboxylic acids; and
amides of $C_{3-6}$ ethylenically unsaturated carboxylic acids, which amides may be unsubstituted or substituted at the nitrogen atom by up to two radicals selected from the group consisting of $C_{1-4}$ alkyl and $C_{1-4}$ hydroxy alkyl radicals.

Suitable alpha olefins and functional monomers have been discussed above. Suitable $C_{2-8}$ alkenyl or hydroxy alkenyl esters of $C_{1-12}$ saturated carboxylic acids include vinyl esters such as vinyl acetate and its homologues; and allyl esters such as allyl acetate and its homologues.

Typically the solution of the polymer of acrylic acid, methacrylic acid, or a mixture thereof is added to the latex in an amount from about 0.1 to about 2.0, preferably 0.1 to 1.0, most preferably from 0.1 to 0.5 parts by dry weight per 100 parts by dry weight of latex polymer. After the addition of the cationic emulsifier the latex is made cationic by adjusting the pH with an inorganic acid.

Preferred polymers of acrylic acid, methacrylic acid, a mixture thereof or salts thereof are soluble in water. Preferably these polymers have a molecular weight of less than 100,000, preferably less than 60,000. These molecular weight limits are practical from the point of view of viscosity problems in blending salts of high molecular weight polymers of acrylic or methacrylic acids with an anionic latex prior to making it cationic.

The cationic latex mixture is then added to the cationic emulsion of asphalt, bitumen or coal tar. The latex is added in an amount to provide up to about 20 parts by dry weight of said polymer. Preferably, the polymers are used in an amount up to about 20, preferably from about 3 to 15 parts by dry weight per 100 parts by dry weight of asphalt, bitumen, coal tar or a mixture thereof.

Typically, such emulsions are applied to a surface, then about 1000 parts by weight of aggregate is laid over about 100 parts by dry weight of the asphalt, bitumen or tar. The aggregate may be a mixture of fine aggregate such as sand and more coarse aggregate such as gravel. In some applications such as surface sealing, the aggregate may be entirely fine aggregate such as sand.

The following examples are intended to illustrate the invention and are not intended to restrict its scope. In the following examples unless otherwise specified, parts are parts by dry weight.

In the following experiments, a cationic bitumen emulsion under the tradename Actimul RE 65% was obtained from Societe Chimique de la Route (SCR).

The effect of a salt of polyacrylic acid on the setting time and drying time of the bitumen emulsion is demonstrated by the following experiment.

A sample of a low molecular weight polyacrylic acid salt sold under the tradename Dispex N40 was made cationic by adding to it about 7 parts per 100 parts of polymer of a tertiary amine sold under the trade mark Noramox S11 and adjusting the pH to from 3 to 3.5 wih HCL. A sufficient amount of this cationic polyacrylic acid was added to the cationic bitumen emulsion to provide 0.3 parts by weight of polyacrylic acid per 100 parts by dry weight bitumen. The bitumen emulsion was then spread in a polyester cup and gravelled with washed and dried aggregate with a particle size of 6–10 mm. The time at which the stones were no longer movable and the time at which the emulsion dried was recorded.

|  | Bitumen Emulsion | Bitumen Emulsion |
|---|---|---|
| Polyacrylic acid | — | 0.3 |
| Starts setting | 45 min. | 5 min. |
| — |  | Completely gelled after 10 min. |
| End Drying | 120 min. | — |

This experiment clearly shows the setting of a cationic bitumen emulsion is reduced by the addition of 0.3 parts by weight of a low molecular weight polyacrylic acid per 100 parts by dry weight of bitumen.

A series of various latices was modified with varying amounts of a low molecular weight sodium salt of polyacrylic acid. The modified latex was then made cationic by adding 7 parts per 100 parts of polymer of a tertiary amine sold under the tradename Noramox S-11. The pH of the latex was adjusted to 3–3.5 with HCl. Then 3 parts by dry weight of the resulting cationic latex added to 100 parts by dry weight of the bitumen emulsion. The setting and drying time for the bitumen emulsion were determined as described above. The results are recorded in Table 2.

TABLE 2

| Latex | Polyacrylic Acid Salt | Setting Time min | Drying Time min |
|---|---|---|---|
| Asphalt (non-modified) | — | 45 | 120 |
| SBR-23% Styrene | — | 110 | more than 240 |
| " | 0.1 | 45 | 180 |
| " | 0.25 | 30 | 150 |
| " | 0.5 | 15 | 80 |
| " | 0.3 | 30 | 120 |
| SBR-23% styrene reinforced with 6 phr of high Styrene resin | — | 110 | more than 240 |
|  | 0.4 | 30 | 150 |
|  | 0.5 | 30 | 135 |
| POLYSAR Latex 3720 | — | 30 | more than 240 |
| carboxylated SBR | 0.3 | 30 | 135 |
| POLYSAR Latex 3515 | — | 50 | more than 240 |
| Carboxylated SBR | 0.3 | 30 | 180 |
| POLYSAR Latex 3703 | — | 80 | 240 |
| Carboxylated SBR | 0.3 | 30 | 150 |
| BAYPRENE | — | 100 | 240 |
| KA 8306 polychloroprene latex | 0.3 | 60 | 180 |
|  | — | 120 | more than 120 |
| Natural Latex | 0.3 | 30 | 80 |

POLYSAR is a trade mark of Polysar Limited
BAYPRENE is a trade mark of BAYER AG.
The experiment with the SBR latex containing 23% styrene was repeated except that 0.3 parts of polyacrylic acid were replaced with 0.3 parts of a copolymer of acrylic acid and acrylonitrile. The initial setting time was greater than 90 minutes. The drying time was greater than 240 minutes.

A series of modified cationic asphalt emulsion prepared above were tested for their cohesive strength in accordance with Essai d'Adhesion Globale A La Plaque Vialit of the Laboratoire Central des Ponts et Chaussees (sometimes called the French Chip Test).

In this test two stainless steel plates 200 mm/200 mm/3 mm are coated with 1.5 kg dry/m$^2$ latex modified bitumen emulsion (M.B.E.) 100 stainless steel balls with a diameter of 12 mm are put in the M.B.E. and the plates allowed to dry for 24 h at room temperature. Afterwards, the one plate is dried for 48 h more at room temperature, while the second plate is aged 48 h in an oven at 60° C. Both plates are then brought to 5° C. by means of a cooling bath. The plates are then inverted on a four point stand and a steel ball (500 g, 50 mm diam.) is then dropped from a 50 cm height to the back of each plate ten times. The number of balls fallen from the asphalt each time and the number of balls remaining in the asphalt on the plate are recorded.

The number of balls fallen in each is multiplied by a factor ranging from 10 to 1 sequentially for the first to the tenth drop of the 500 g ball. The sum of these factors is substracted from 1000 to give a measure of the cohesive strength of the asphalt. The results are recorded in Table 3.

TABLE 3

| Latex | Polyacrylic Acid Salt | Initial Cohesive Strength | # balls remaining | Heat Aged (Cohesive Strength) | # balls remaining |
|---|---|---|---|---|---|
| Asphalt (non-modified) | — | less than 500 | 0 | less than 50 | 0 |
| SBR-23% Styrene | 0.3 | 955 | 90 | 993 | 97 |
| SBR-23% styrene reinforced with 6 phr of high Styrene resin | 0.4 | 931 | 87 | 791 | 55 |
| KA 8306 polychloroprene latex | 0.3 | 277 | 0 | 88 | 0 |

What is claimed is:

1. A method for causing an aqueous cationic emulsion of bitumen, asphalt, coal tar, or a mixture thereof, which is not clay dispersed, to become resistant to movement in less than 40 minutes after contact, at room temperature, with aggregate which comprises adding to said cationic emulsion per 100 parts by weight of bitumen, asphalt, coal tar or a mixture thereof an aqueous cationic compound having a pH from 1 to 5 which is not stabilized with a salt of oxalic acid, comprising:

(i) from 0.001 to 0.2 parts by weight of one or more polymers selected from the group consisting of acrylic acid, methacrylic acid and mixtures thereof, which polymers have a molecular weight less than 60,000;
(ii) from 0.1 to 2.0 parts by weight of a cationic surfactant of the formula

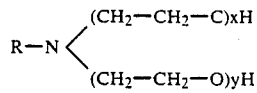

wherein R is a $C_{10-18}$ alkenyl radical; x and y are integers and the sum of $x+y$ is from 2 to 20; and
(iii) up to 20 parts by dry weight of a latex of a polymer selected from the group consisting of:
  (i) copolymers comprising: from about 20 to 60 weight percent of a $C_{8-12}$ vinyl aromatic monomer which may be unsubstituted or substituted by a $C_{1-4}$ alkyl radical or a chlorine or bromine atom; and from about 80 to 40 weight percent of a $C_{4-6}$ conjugated diolefin;
  (ii) terpolymers comprising from about 20 to 60 weight percent of a $C_{8-12}$ vinyl aromatic monomer which may be unsubstituted or substituted by a $C_{1-4}$ alkyl radical or a chlorine or bromine atom; from about 80 to 40 weight percent of a $C_{4-6}$ conjugated diolefin; and from about 0.5 to 10 weight percent of one or more monomers selected from the group consisting of $C_{3-6}$ ethylenically unsaturated carboxylic acids; $C_{1-4}$ alkyl or hydroxy alkyl esters of $C_{3-6}$ ethylenically unsaturated carboxylic acid; $C_{3-6}$ ethylenically unsaturated aldehydes, amides of $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxy alkyl radicals;
  (iii) polymers of one or more $C_{4-6}$ conjugated diolefins which may be unsubstituted or substituted by a chlorine atom;
  (iv) copolymers of up to about 40 weight percent of a $C_{3-6}$ alkenyl nitrile; and the balance one or more $C_{4-6}$ conjugated diolefins;
  (v) copolymers of from 1 to about 40 weight percent of a $C_{2-3}$ alpha olefin; from about 99 to 50 weight percent of a $C_{2-8}$ alkenyl or hydroxy alkenyl ester of a $C_{1-12}$ saturated carboxylic acid; and 0 up to about 10 weight percent of one or more monomers selected from the group consisting of: $C_{3-6}$ ethylenically unsaturated carboxylic acids; $C_{3-6}$ ethylenically unsaturated aldehydes; $C_{1-4}$ alkyl and hydroxy alkyl esters of $C_{3-6}$ ethylenically unsaturated carboxylic acids; and amides of $C_{3-6}$ ethylenically unsaturated carboxylic acids which amides may be unsubstituted or substituted at the nitrogen atom by one or more radicals selected from the group consisting of $C_{1-4}$ alkyl or hydroxy alkyl radicals.

2. A process according to claim 1 wherein said latex is present in an amount from 3 to 15 parts by dry weight.

3. A method according to claim 2 wherein said latex is a cold emulsion polymerized latex comprising from about 20 to 40 weight percent of styrene and from about 80 to 60 weight percent of butadiene.

4. A composition which does not contain clay or salts of oxalic acid, comprising per 100 parts by dry weight of a cationic emulsion of bitumen, asphalt, coal tar and a mixture thereof from 0.001 to 0.2 parts by weight of a polymer selected from the group consisting of acrylic, methacrylic acid, and mixtures thereof, from 0.1 to 2 parts by weight of a cationic surfactant of the formula

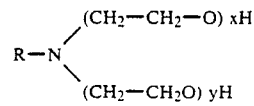

wherein x and y are integers and the sum of $x+y$ is from 2 to 20, and up to 20 parts by dry weight of a latex of a polymer selected from the group consisting of:
  (i) copolymers comprising: from about 20 to 60 weight percent of a $C_{8-12}$ vinyl aromatic monomer which may be unsubstituted or substituted by a $C_{1-4}$ alkyl radical or a chlorine or bromine atom; and from about 80 to 40 weight percent of a $C_{4-6}$ conjugated diolefin;
  (ii) terpolymers comprising from about 20 to 60 weight percent of a $C_{8-12}$ vinyl aromatic monomer which may be unsubstituted or substituted by a $C_{1-4}$ alkyl radical or a chlorine or bromine atom; from about 80 to 40 weight percent of a $C_{4-6}$ conjugated diolefin, and from about 0.5 to 10 weight percent of one or more monomers selected from the group consisting of $C_{3-6}$ ethylenically unsaturated carboxylic acids; $C_{1-4}$ alkyl or hydroxy alkyl esters of $C_{3-6}$ ethylenically unsaturated carboxylic acid; $C_{3-6}$ ethylenically unsaturated aldehydes, amides of $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxy alkyl radicals;
  (iii) polymers of one or more $C_{4-6}$ conjugated diolefins which may be unsubstituted or substituted by a chlorine atom;
  (iv) copolymers of up to about 40 weight percent of a $C_{3-6}$ alkenyl nitrile; and the balance one or more $C_{4-6}$ conjugated diolefins;
  (v) copolymers of from 1 to about 40 weight percent of a $C_{2-3}$ alpha olefin; from about 99 to 50 weight percent of a $C_{2-8}$ alkenyl or hydroxy alkenyl ester of a $C_{1-12}$ saturated carboxylic acid, and optionally from about 0.5 to 10 weight percent of one or more monomers selected from the group consisting of: $C_{3-6}$ ethylenically unsaturated carboxylic acids; $C_{3-6}$ ethylenically unsaturated aldehydes; $C_{1-4}$ alkyl and hydroxy alkyl esters of $C_{3-6}$ ethylenically unsaturated carboxylic acids; and amides of $C_{3-6}$ ethylenically unsaturated carboxylic acids which amides may be unsubstituted or substituted at the nitrogen atom by one or more radicals selected from the group consisting of $C_{1-4}$ alkyl or hydroxy alkyl radicals.

5. A composition according to claim 4 wherein said latex is present in an amount from 3 to 15 parts by dry weight.

6. A composition according to claim 5 wherein said latex is a cold emulsion polymerized latex comprising from about 20 to 40 weight percent of styrene and from about 80 to 60 weight percent of butadiene.

7. A composition according to claim 6 further comprising up to about 1000 parts by weight of an aggregate material per 100 parts by dry weight of bitumen, asphalt, tar or a mixture thereof.

* * * * *